Jan. 24, 1956
R. A. GROUSE
2,731,705
MANUFACTURE OF CAPACITORS
Filed Sept. 11, 1951
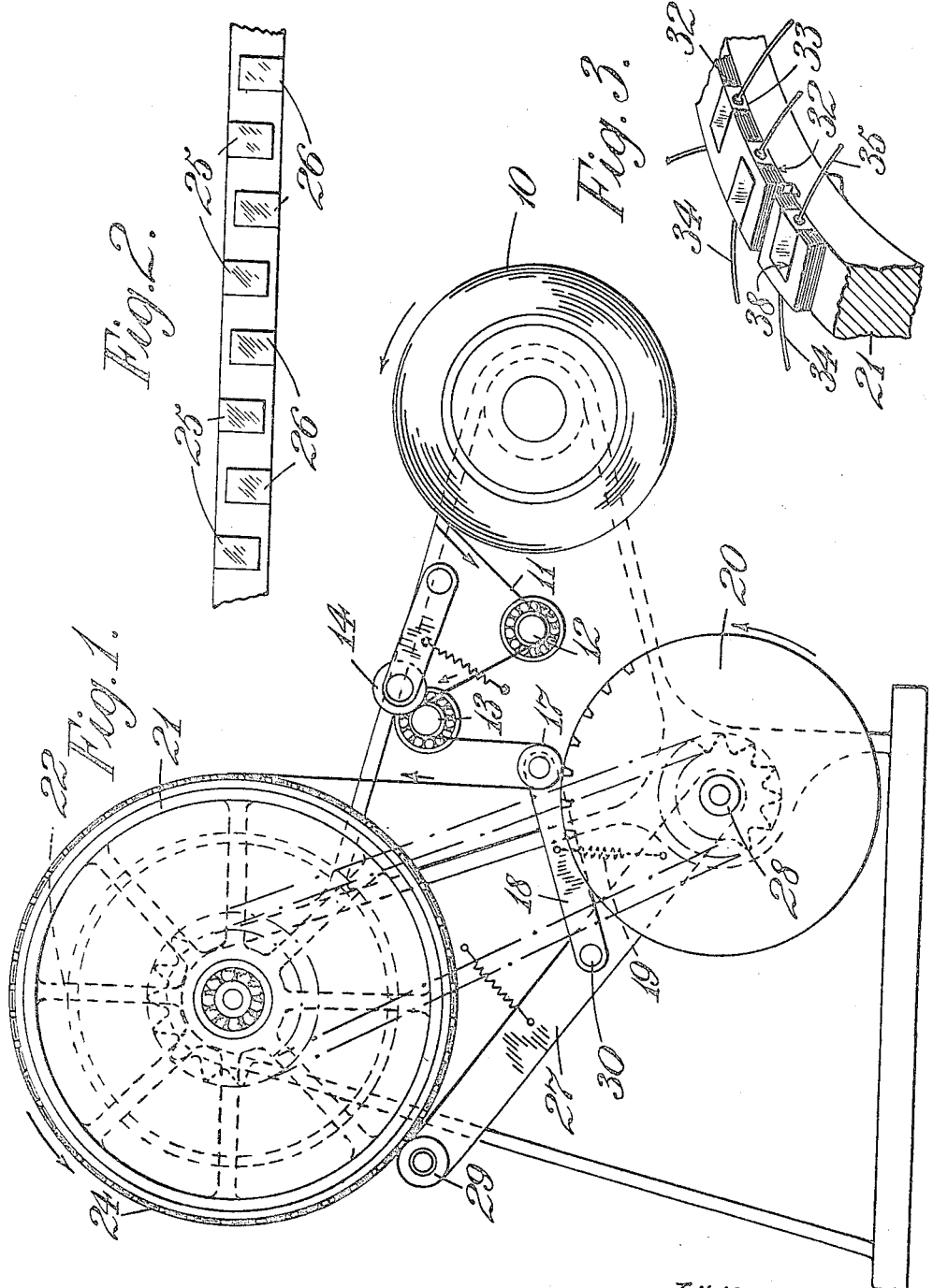
INVENTOR
R. A. Grouse
By Watson, Cole, Grindle & Watson United States Patent Office 2,731,705
Patented Jan. 24, 1956

2,731,705

MANUFACTURE OF CAPACITORS

Richard Alfred Grouse, London, England, assignor to A. H. Hunt Capacitors, Limited, London, England, a British company Application September 11, 1951, Serial No. 246,113

Claims priority, application Great Britain December 13, 1950

10 Claims. (Cl. 29—25.42)

This invention relates to the manufacture of fixed capacitors. The manufacture of such capacitors having sheet dielectric involves the building up of a laminated structure in which dielectric and electrodes are interleaved. The two most common methods of achieving this are stacking, where usually rigid dielectrics such as mica or glass are used, and winding, where flexible dielectrics and electrodes are wound together into a roll. Whichever method is used the capacitors are usually subjected to a number of subsequent operations such as having their ends sprayed with metal, the fixing of terminal wires, impregnation, the application of outer casings and so forth. This involves considerable and difficult handling, the difficulties increasing as the capacitors are smaller in size. Very small stacked capacitors are extremely troublesome to make.

It is an object of the present invention to facilitate the manufacture of stacked capacitors.

According to one feature of this invention a process of manufacture of stacked electrical capacitors comprises in combination the steps of taking strip dielectric having an one face a plurality of metallised areas separated from one another by unmetallised areas, assembling it in a plurality of layers so that unmetallised areas are superposed on one another, and subdividing the assembly by transverse cuts through the unmetallised areas into a plurality of separate capacitor stacks.

Preferably the strip or strips of dielectric are initially metallised all over one face and the unmetallised areas are formed by demetallising certain areas of the metallised face to leave behind a series of metallised areas which, when the strip or strips are assembled in a plurality of layers, form in the assembly a number of individual capacitor stacks.

The strip or strips of dielectric may be demetallised in such a manner that when assembled in a plurality of layers successive metallised areas of each stack extend from alternate sides of the dielectric strip, and overlap one another.

According to another feature of this invention the layers are formed as an annulus by winding a strip or strips around a former, so that there is formed in the annulus a predetermined number of capacitor stacks spaced from each other in a circumferential direction, and wherein the annulus so produced is divided into appropriate segments to constitute the separate capacitors.

According to another feature of this invention plain strips of dielectric may be positioned intermediate of the metallised strips of dielectric.

A preferred way of carrying out the invention comprises taking a single strip of flexible sheet dielectric, metallising it on one face, passing it into contact with a demetallising electrode which demetallises the dielectric in a devious course along its length to leave behind a staggered pattern of metallised areas which in sequence extend from alternate edges of the strip, and winding the strip into an annulus to form a predetermined odd number of capacitors so that successive electrodes of each capacitor automatically overlap from alternate axial faces of the annulus.

Stack capacitors made in accordance with this invention may have their ends sprayed with metal, terminal wires attached and be vacuum dried and impregnated before the subdivision of the assembly.

One process for the manufacture of stack capacitors in accordance with this invention will now be described by way of example, reference being made to the accompanying drawing, in which:

Figure 1 is a diagrammatic representation of an apparatus for carrying out the process;

Figure 2 is a plan view of a portion of metallised dielectric which has been partially demetallised during the process, and, Figure 3 is a perspective view of a portion of an annulus which has been wound by the apparatus shown in Figure 1, the annulus having had certain subsequent operations performed upon it.

Referring to Figure 1, reference 10 denotes a stockroll of a single strip of paper dielectric which has been metallised on one face by a known process of aluminium deposition in vacuo. The paper dielectric 11 is led from the stock-roll 10 by way of the guide roller 12 to pass between the two rollers 13 and 14. The roller 13, which is in contact with the metallised surface of the paper, is of metal and is connected to the negative, earth, side of an electrical supply. The other roller 14 is of rubber and is spring urged to press the strip 11 on to the metal roller 13, thereby ensuring an effective electrical contact. Beyond this point the strip is led round another roller 17 which is carried at one extremity of a link 18. This link is so influenced by a spring 19 that the roller presses the metallised face of the strip into contact with a demetallising-wheel 20 which is connected to the positive terminal of the electrical supply. The strip is finally led to a forming-ring 21 which is located on a power driven winding-wheel 22.

The demetallising-wheel 20 is similar to that shown and described in Patent Application Serial No. 70,237 that is, briefly, it has a cylindrical surface having a raised portion which follows a devious key-pattern in a direction around the circumference. This surface demetallises a corresponding surface on the strip of paper to leave behind the pattern of metallised areas shown in Figure 2. It will be appreciated that the pitch of the key-pattern of the demetallising-wheel used in this process is constant so that the areas of metallisation 25 and 26, which extend from opposite edges of the strip, are spaced apart in a regular manner.

The demetallising-wheel 20 is driven from the winding-wheel 22 by means of a driving chain in a manner such that the outer circumferential speed of the forming-ring, which is located on the driving-wheel, is equal to the outer circumferential speed of the de-metallising-wheel. In this way no relative slipping between the paper and the demetallising-wheel will take place for the initial turn of paper wound on to the forming-ring.

The proportion of the pattern on the cylindrical surface of the demetallising-wheel and the circumference of the forming-ring are such that a predetermined odd number of metallised areas are exactly wound on to the forming-ring in the initial turn. On the subsequent turn metallised areas will be disposed over the metallised areas of the first turn, but as there is an odd number they will extend from the alternate edge of the strip. An annulus as shown at 24, Figure 1, would continue to be built up in this manner if demetallisation could take place at the point at which the paper is wound on to the annulus. In this case the continually elongating pattern which is required to extend the correct number of metallised areas around the annulus as its diameter increases, would automatically be brought about, as the speed of the paper increases relative to the constant speed of the demetallising-wheel, with slip resulting between them. This is not, however, possible in practice as there will always be a length of demetallised paper between the demetallising-wheel and the point at which the paper is wound on to the annulus. This results in a time lag between an increase in diameter of the annulus and the arrival of the correctly elongated pattern. In order to overcome this error the following compensating device is used.

An arm 27 is at one end freely mounted on the shaft 28 which carries the demetallising-wheel, and the arm has mounted at its other end a rubber roller 29. The arm is spring urged to hold the roller 29 against the annulus at a point some distance away from the point of winding. Pivotally connected at a point 30 which lies intermediate of the two ends of the arm 27 is the link 18 and, as previously described, this link carries at its free end the roller 17 which holds the paper in contact with the demetallising-wheel. Thus, as the annulus 24 increases in diameter, the arm 18 is displaced, causing the roller 17 and the paper in contact with the demetallising-wheel to move a small distance in the direction of rotation of the demetallising-wheel. The result of this is a local momentary elongation of the pattern on the paper, the degree of which is determined by the dimensions of the arms and the positions of the respective rollers. These are made such that the elongation compensates the error mentioned above.

When the annulus 24 has been completely wound, the paper dielectric is cut and the free end of the annulus made fast by a convenient adhesive. At this stage the annulus contains a number of individual capacitor sections which resemble in geometry the stacked type of capacitor well known in the art. As shown at 32, Figure 3, the stacks extend radially outwards as sections of the annulus and are, of course, slightly curved. The radius of curvature, however, is large in relation to the dimensions of the stacks so that this is not objectionable either technically or commercially. It will be understood that each stack comprises layers of dielectric each of which carries an area of metallisation. The metallised areas extend alternately from opposite axial faces of the annulus to constitute the two series of capacitor electrodes. The stacks are spaced apart in a circumferential direction by unmetallised dielectric.

After an annulus has been wound in accordance with the foregoing description it is removed from the winding apparatus. This is done by removing the annulus together with the forming-ring as a single unit, subsequent operations being performed on the annulus whilst it is still in position on the forming-ring.

The first operation is to spray the end faces of each stack with copper and in order to do this masks are placed over each axial face of the annulus so that only the end area of each stack is in fact sprayed. The main reason for this is that the annulus is later vacuum-dried and impregnated, and if the whole of the axial faces were sprayed with copper it would tend to seal up the annulus. The sprayed portion of the end faces of the stacks is indicated at 33 in Figure 3.

The next operation is to solder terminal wires on to the ends of the capacitors, and this may be done either manually or automatically. In either case it is advantageous to mount the annulus and forming-ring on to a carrier so that each capacitor may be rotated in turn to the soldering station. The terminal wires are shown in position on the capacitor sections at 34 and 35 in Figure 3.

In accordance with normal practice, the next step is vacuum-drying and impregnation. It is particularly advantageous to use for the impregnant a suitable material which by heat or chemical action can be made permanently solid after impregnation. In general, materials capable of polymerisation and having good impregnating and dielectric properties are preferred. Two such materials are those marketed under the registered trademarks "Marco (SB-28C)" and "Araldite (Resin B)." By using such materials the annulus as a whole becomes in effect solid, the advantage of this being later seen.

After the drying and impregnating operation the capacitors, whilst still in the annulus, are tested and printed. This is done by placing the annulus in an indexing mechanism which rotates the annulus step by step so that each capacitor comes in turn to testing and printing stations. At subsequent stations the annulus is cut into the appropriate capacitor sections and these sections ejected. In the latter instance the capacitors are conveniently retained on the forming ring between the cutting and ejecting stations by the adhesive properties of the solidified impregnant, a capacitor in such a position being shown at 38 in Figure 3.

Where manufacturing policy requires it the capacitors may be tested in the annulus together, instead of individually. This may be done by appropriate connection of their terminal wires to place the capacitors in parallel with one another. If they stand up together to a flash test and are within a certain percentage of their desired total capacity, they may be declared satisfactory. If this is not so, and one or both of the tests prove that the capacitors are not of the required standard then the capacitors can subsequently be tested individually to show up those which are faulty.

The final operation to be performed is the application of a protective casing to the capacitor. This is a separate process and may be carried out by any of the well known methods. Prior to this it may be desired in certain cases to flatten the slightly curved capacitors, and this may be carried out by a convenient mechanical device.

The following is an example of a stack capacitor made from a single strip of metallised paper dielectric in accordance with the process described.

| | |
|---|---|
| Width of paper | 0.5 in. |
| Thickness of paper | 0.00036 in. |
| No. of turns or layers | 200. |
| Length of capacitor | 0.5 in.=width of paper. |
| Width of capacitor | 0.3 in. |
| Thickness of capacitor | .072. |
| Length of metallised areas | 0.4375 in. |
| Width of metallised areas | 0.2375. |
| Capacitance | 0.05 mfd. |

The impregnating material was the resin marketed under the registered trademark "Marco," No. SB-28C.

It will be appreciated that although paper dielectric only has been described, other suitable dielectric may be used, as for example, polystyrene plastic dielectric.

I claim:

1. A process of manufacture of stacked electrical capacitors comprising in combination the steps of providing thin flexible strip dielectric material bearing on one face a plurality of metallized areas separated from one another by unmetallized spaces, winding said strip dielectric material around a former to produce an annulus made up of a plurality of turns and in which the metallized areas in different turns overlie one another and are separated by dielectric whereby there are built up a plurality of capacitor stacks spaced around the periphery of the former, affixing terminals to the individual capacitor stacks while they are still in the annulus, and thereafter parting each capacitor stack from the annulus.

2. A process of manufacture of stacked electrical capacitors comprising in combination the steps of providing thin flexible strip dielectric material bearing on one face a plurality of metallized areas separated from one another by unmetallized spaces, winding said strip dielectric material around a former to produce an annulus made up of a plurality of turns and in which the metallized areas in different turns overlie one another and are separated by dielectric whereby there are built up a plurality of capacitor stacks spaced around the periphery of the former, affixing terminals to and impregnating the individual capacitor stacks while they are still in the annulus, and thereafter parting each capacitor stack from the annulus.

3. A process of manufacture according to claim 2 wherein the capacitor stacks in the annulus are divided from one another by cutting through the unmetallized portions of the dielectric layers between the stacks to permit of eventual parting of each stack from the annulus, and the impregnation is carried out before the cutting using an impregnating material which can be made permanently solid after impregnation so that when the annulus is subsequently cut the divided capacitors are retained around the former periphery by the adhesive property of the solidified impregnating material until such time as it is desired to part them.

4. A process of manufacture of stacked electrical capacitors comprising in combination the steps of providing thin flexible strip dielectric material bearing on one face a plurality of metallized areas separated from one another by unmetallized spaces, winding said strip dielectric material around a former to produce an annulus made up of a plurality of turns and in which the metallized areas in different turns overlie one another and are separated by dielectric whereby there are built up a plurality of capacitor stacks spaced around the periphery of the former, affixing terminals to and impregnating each capacitor stack and testing the stacks, and thereafter parting each capacitor stack from the annulus, the capacitor stacks in the annulus being divided from one another preparatory to said parting by making a plurality of radial cuts through the annulus, and the impregnation being carried out before the cutting using an impregnating material which can be made permanently solid after impregnation so that when the annulus is subsequently cut the divided capacitors are retained around the former periphery by the adhesive property of the solidified impregnating material until such time as it is desired to part them.

5. A process of manufacture of stacked electrical capacitors comprising in combination the steps of providing thin flexible strip dielectric material bearing on one face a plurality of metallized areas separated from one another by unmetallized spaces, and winding said strip dielectric material around a former to produce an annulus made up of a plurality of turns and in which the metallized areas in different turns overlie one another and are separated by dielectric whereby there are built up a plurality of capacitor stacks spaced around the periphery of the former, affixing terminals to and impregnating each capacitor stack and testing and printing the stacks, and thereafter parting each capacitor stack from the annulus, the capacitor stacks in the annulus being divided from one another preparatory to said parting by cutting through the unmetallized portions of the dielectric layers between the stacks, and the impregnation being carried out before the cutting using an impregnating material which can be made permanently solid after impregnation so that when the annulus is subsequently cut the divided capacitors are retained around the former periphery by the adhesive property of the solidified impregnating material until such time as it is desired to part them.

6. A process of manufacture of stacked electrical capacitors comprising in combination the steps of producing a thin flexible strip of dielectric material bearing on one face a succession of metallized areas separated by unmetallized spaces, said areas being staggered so that successive areas extend from alternate edges of the strip, winding said strip around a former to produce an annulus made up of a plurality of turns with the metallized areas of different turns overlying one another and an odd number of areas in each turn of the strip whereby there are built up a plurality of capacitor stacks spaced around the periphery of the former and in each of which stacks successive electrodes overlap from alternate axial faces of the annulus, affixing terminals to the individual capacitor stacks while they are still in the annulus, and thereafter parting each capacitor stack from the annulus.

7. A process of manufacture according to claim 6 wherein the length of successive metallized areas increases progressively along the strip to allow for the increase in length of the turns of the dielectric in the annulus with increase in diameter of the annulus.

8. A process of manufacture according to claim 7 wherein the dielectric strip bearing spaced metallized areas is produced by taking a strip of thin flexible dielectric material metallized continuously on one face, and demetallizing it in a devious course along its length to leave behind the desired staggered pattern of metallized areas.

9. A process of manufacture of stacked electrical capacitors comprising in combination the steps of producing a strip of thin flexible dielectric material bearing on one face a succession of metallized areas of progressively increasing length separated by unmetallized spaces, said areas being staggered so that successive areas extend from opposite edges of the strip, winding said strip around a former to produce an annulus made up of a plurality of turns with the metallized areas on different turns overlying one another and an odd number of areas in each turn of the strip whereby there are built up a plurality of capacitor stacks spaced around the periphery of the former in each of which successive electrodes overlap from alternate axial faces of the annulus, affixing terminals to and impregnating the individual capacitor stacks while they are still in the annulus, and thereafter parting each capacitor stack from the annulus.

10. A process of manufacture of stacked electrical capacitors comprising in combination the steps of taking a strip of thin flexible dielectric material metallized continuously on one face and demetallizing it in a devious course along its length to leave behind a succession of metallized areas of progressively increasing length separated by unmetallized spaces, said areas being staggered so that successive areas extend from opposite edges of the strip, winding said strip around a former to produce an annulus made up of a plurality of turns with the metallized areas on different turns overlying one another and an odd number of areas in each turn of the strip whereby there are built up a plurality of capacitor stacks spaced around the periphery of the former in each of which stacks successive electrodes overlap from opposite axial faces of the annulus, affixing terminals to and impregnating each capacitor stack and testing the stacks, and thereafter parting each capacitor stack from the annulus, the capacitor stacks in the annulus being divided from one another preparatory to said parting by making a plurality of radial cuts through the annulus, and the impregnation being carried out before the cutting using an impregnating material which can be made permanently solid after impregnation so that when the annulus is subsequently cut the divided capacitors are retained around the former periphery by the adhesive property of the solidified impregnating material until such time as it is desired to part them.

References Cited in the file of this patent

UNITED STATES PATENTS

| | | |
|---|---|---|
| 1,307,341 | Brinton | June 24, 1919 |
| 1,909,079 | Steerup | May 16, 1933 |
| 1,926,842 | Dubilier | Sept. 12, 1933 |
| 2,352,926 | Weiss | July 14, 1944 |
| 2,388,139 | Grouse et al. | Oct. 30, 1945 |
| 2,585,752 | Dorst | Feb. 12, 1952 |

FOREIGN PATENTS

| | | |
|---|---|---|
| 903,040 | France | Sept. 21, 1945 |